United States Patent
Jactat et al.

(10) Patent No.: US 10,230,569 B2
(45) Date of Patent: Mar. 12, 2019

(54) SYSTEMS AND METHODS FOR RAN-WLAN AGGREGATION

(71) Applicant: TCL Communication Limited, Kowloon (HK)

(72) Inventors: Caroline Jactat, Nanterre (FR); Pierre Bonnard, Nanterre (FR)

(73) Assignee: TCL COMMUNICATION LIMITED, Hong Kong (HK)

(*) Notice: Subject to any disclaimer, the term of this patent is extended or adjusted under 35 U.S.C. 154(b) by 0 days.

(21) Appl. No.: 15/462,086

(22) Filed: Mar. 17, 2017

(65) Prior Publication Data

US 2017/0288949 A1 Oct. 5, 2017

(30) Foreign Application Priority Data

Apr. 1, 2016 (GB) .................. 1605548.5

(51) Int. Cl.
| | |
|---|---|
| *H04L 12/24* | (2006.01) |
| *H04L 12/26* | (2006.01) |
| *H04W 16/32* | (2009.01) |
| *H04W 36/08* | (2009.01) |
| *H04W 36/22* | (2009.01) |
| *H04W 28/08* | (2009.01) |
| *H04J 11/00* | (2006.01) |
| *H04W 84/12* | (2009.01) |
| *H04W 88/06* | (2009.01) |

(52) U.S. Cl.
CPC .......... *H04L 41/0663* (2013.01); *H04L 43/16* (2013.01); *H04W 16/32* (2013.01); *H04W 28/08* (2013.01); *H04W 36/08* (2013.01); *H04W 36/22* (2013.01); *H04J 11/00* (2013.01); *H04W 84/12* (2013.01); *H04W 88/06* (2013.01)

(58) Field of Classification Search
CPC ...... H04J 11/00; H04L 41/0663; H04L 43/16; H04W 16/32; H04W 36/08; H04W 36/22; H04W 84/12; H04W 88/06
USPC .......................................................... 455/444
See application file for complete search history.

(56) References Cited

U.S. PATENT DOCUMENTS

| | | | | |
|---|---|---|---|---|
| 2013/0012161 A1* | 1/2013 | Rubin | ..................... | H04L 47/14 455/406 |
| 2013/0225223 A1* | 8/2013 | Nukala | ............... | H04W 52/241 455/522 |
| 2016/0242235 A1* | 8/2016 | Vasudevan | .......... | H04W 76/026 |

(Continued)

FOREIGN PATENT DOCUMENTS

| | | |
|---|---|---|
| EP | 3 001 765 A1 | 3/2016 |
| GB | 2505990 A | 3/2014 |

(Continued)

OTHER PUBLICATIONS

ETSI, "LTE; Evolved Universal Terrestrial Radio Access (E-UTRA) and Evolved Universal Terrestrial Radio Access Network (E-UTRAN); Overall description; Stage 2," published Jan. 2016; Version 13.2.0 Rel 13, pp. 229-242.

(Continued)

*Primary Examiner* — Timothy X Pham
(74) *Attorney, Agent, or Firm* — Baker Hostetler LLP

(57) ABSTRACT

Methods and systems for controlling the transmission of data from a mobile device to a base station is provided. Data may be transmitted directly from the mobile device to the base station, or via a WLAN access point.

10 Claims, 6 Drawing Sheets

(56) References Cited

U.S. PATENT DOCUMENTS

| | | | | |
|---|---|---|---|---|
| 2016/0302064 | A1* | 10/2016 | Tsai | H04W 12/06 |
| 2016/0366709 | A1* | 12/2016 | Wu | H04W 76/02 |
| 2017/0094701 | A1* | 3/2017 | Hong | H04W 76/022 |
| 2017/0099625 | A1* | 4/2017 | Li | H04W 76/026 |
| 2017/0171771 | A1* | 6/2017 | Jung | H04W 24/10 |

FOREIGN PATENT DOCUMENTS

| | | |
|---|---|---|
| WO | 2014/204716 A2 | 12/2014 |
| WO | 2015/059055 A2 | 4/2015 |
| WO | 2016/025475 A1 | 2/2016 |

OTHER PUBLICATIONS

3GPP Draft; RP-160522 eLWA-WID-v15; TSG RAN; Mar. 7, 2016; Mobile Competence Centre; Sophia-Antipolis Cedex, France; Intel Corporation, Qualcomm Inc, XP051077219.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP Standard; 3GPP TS 36.300, vol. RAN WG2, No. V13.2.0, Jan. 11, 2016, pp. 1-290, XP051047745.

Extended European Search Report in European Patent Application No. 17163366.2, dated Sep. 5, 2017.

\* cited by examiner

SYSTEMS AND METHODS FOR RAN-WLAN AGGREGATION

CROSS-REFERENCE TO RELATED APPLICATIONS

This application claims priority to foreign United Kingdom patent application No. GB 1605548.5, filed on Apr. 1, 2016, the disclosure of which is incorporated by reference in its entirety.

TECHNICAL FIELD

The present disclosure relates to systems and methods for use in telecommunication networks. More specifically, it relates to systems and methods that aggregate Radio Access Network (RAN) and Wireless Local Area Network (WLAN) communications.

BACKGROUND

RANs and WLANs are both wireless communication technologies. In a cellular RAN, the areas where the network is distributed are covered by cells, each served by at least one base station (commonly known as a NodeB in a 3G network and an eNodeB in an LTE/4G network). Mobile devices, known as User Equipment (UE), located within a cell connect to the telecommunications core network via the base station of the cell. Each cell typically abuts one or more neighbouring cells.

WLAN describes a wireless communication system in which coverage is provided over smaller areas. A common example is Wi-Fi, specified by the IEEE 802.11 standards. WLAN enabled devices can establish wireless links with WLAN Access points (APs) which then allow internet access. WLAN enabled devices can be mobile devices such as laptops, personal digital assistants and mobile phones, or fixed devices such as desktops and workstations that are equipped with a WLAN network interface. WLAN systems use the ISM radio band, a portion of the spectrum reserved internationally for industrial, scientific and medical purposes other than telecommunications. No fees or licences are needed for use of this band of the spectrum.

Various techniques have been considered for LTE-WLAN Aggregation (LWA) to allow a UE to connect with both a RAN and a WLAN for data communication. By aggregating data over both types of link the advantages of each system can be utilized in order to increase user throughput. Aggregating implies transmission of RAN based data over a WLAN connection. Transmission of data via two different routes creates the possibility that data sent via one route arrives out of sequence with data sent via the other route. WLAN transmission may be slower than RAN transmission due to contention-based access to radio resources, and the additional time required to forward data from the WLAN to the RAN. Data must thus be re-ordered at the RAN.

The examples described herein provide improved techniques for LTE-WLAN aggregation.

The examples described below are not limited to implementations which solve any or all of the disadvantages of known systems.

SUMMARY OF THE INVENTION

There is provided a method for communication between a mobile device and a base station, wherein the mobile device is in wireless communication directly with the base station and in wireless communication with a WLAN access point, which access point is in communication with the base station, the method performed at the mobile device and comprising the steps of configuring the mobile device according to pre-defined rules to transmit data from the mobile device to the base station directly to the base station and/or via the WLAN access point; and transmitting data from the mobile device to the base station according to the received rules.

The pre-defined rules may be received by the mobile device from the base station.

The rules may indicate that all data should be transmitted via the WLAN access point.

The rules may indicate that if data fails to be transmitted via the WLAN access point, the mobile device should retransmit that data directly to the base station.

The method may further comprise the step of transmitting data directly to the base station that has previously failed to be transmitted to the base station via the WLAN access point.

The rules may indicate that if the mobile device has greater than a threshold amount of data for transmission to the base station, part of the data should be transmitted directly to the base station and the other part of the data should be transmitted via the WLAN access point.

The rules may indicate that if the mobile device has greater than a threshold amount of data for transmission to the base station, that data should be transmitted to the base station via the WLAN access point.

The rules may indicate that if the mobile device has greater than a threshold amount of data for transmission to the base station, that data should be transmitted directly to the base station.

Control information may be transmitted directly from the mobile device to the base station regardless of the rules.

Data transmitted via the WLAN access point may be transmitted in the form of LTE-WLAN Aggregation Adaptation Protocol PDUs.

The PDUs may comprise a Data Radio Bearer identity.

The PDUs may be embedded in WLAN packets for transmission via the wireless connection to the WLAN access point, and the EtherType field indicates the packets relate to an LWA bearer.

The rules may indicate that if the mobile device determines that the amount of pending data for uplink transmission does not exceed the predefined threshold, the data should be transmitted either to the base station or the WLAN access point.

The method may further comprise the step of the WLAN access point forwarding received data to the base station.

There is also provided a method for communication between a mobile device and a base station, wherein the mobile device is in wireless communication directly with the base station and in wireless communication with a WLAN access point, which access point is in communication with the base station, the method performed at the mobile device and comprising the steps of configuring the mobile device such that part of data to be transmitted to the base station is transmitted directly to the base station and the other part of the data is transmitted to the base station via the WLAN access point; determining a difference between the transmission time for data transmitted directly to the base station and the transmission time for data transmitted to the base station via the WLAN access point; and delaying transmission of data transmitted directly to the base station by a time based on the difference.

The step of configuring may be based on rules received from the base station.

The method may further comprise the step of the WLAN access point forwarding received data to the base station.

BRIEF DESCRIPTION OF THE DRAWINGS

Examples of the invention will be described, by way of example, with reference to the following drawings, in which.

DETAILED DESCRIPTION

Examples of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Figure 1:
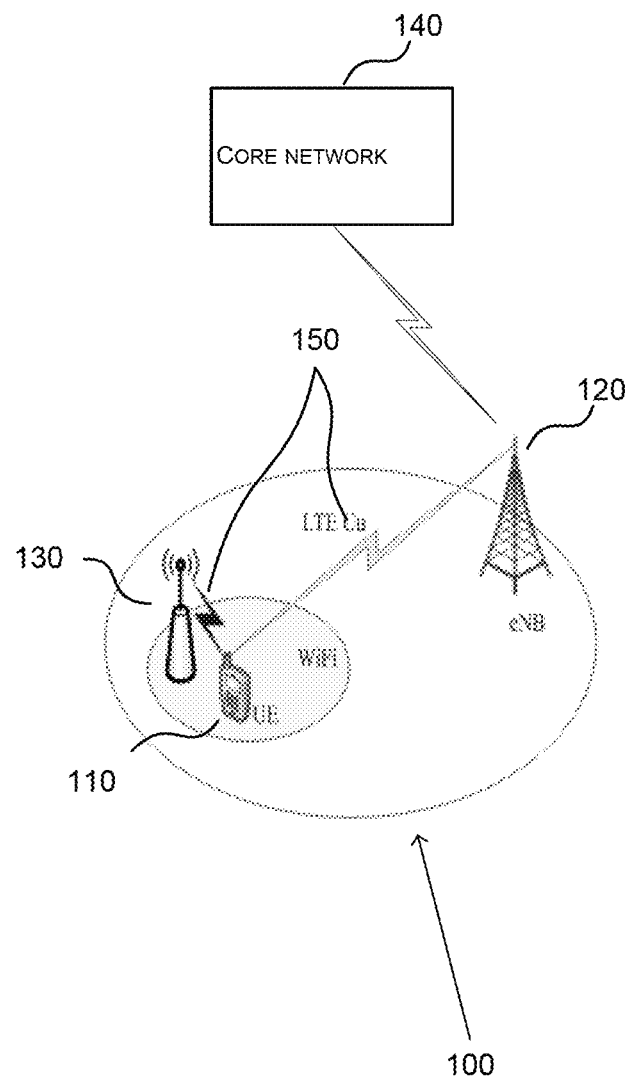
FIG. 1 is a schematic diagram showing a communication.

FIG. 1 is a schematic diagram showing a wireless communication system 100 in which the following disclosure may be implemented. The wireless communications system 100 comprises a RAN, which may be an LTE access network, and a WLAN AP 130. At least one UE 110 can connect to base station 120 of the RAN and WLAN AP 130 within their respective coverage areas. The AP 130 and base station 120 are connected via a wireless or fiber based backhaul link, for example via an Xw interface as defined in the LTE standards. The base station 120 is connected to a core network 140. The following disclosure is given with reference to the LTE standards, but the principles are applicable to other wireless standards.

The base station 120 may communicate control information and/or user data with the core network 140 and/or with other base stations through backhaul links, which may be wired or wireless communication links.

The WLAN AP 130 allows Wi-Fi enabled UEs within its signal coverage to connect to the core network The UE 110 may be a mobile device such as a laptop, a tablet computer, a personal digital assistant and a mobile phone, or a fixed device such as a desktop computer and a workstation. The UE 110 may have hardware and software to support LTE communication and WLAN communication. The UE 110 may support LTE-WLAN carrier aggregation (LWA), which allows the UE 110 to communicate simultaneously with a base station 120 using an LTE wireless link and with a WLAN AP 130 using a WLAN wireless link. The UE 110 may also support a split LWA bearer, which is a bearer whose radio protocols are located in both a base station and a WLAN AP to use both RAN and WLAN radio resources for the transmission of data.

The wireless links 150 shown in the wireless communications system 100 may include uplink transmissions from a UE 110 to a base station 120, and/or downlink transmissions, from a base station 120 to a UE 110.

In order to efficiently utilize both the RAN and WLAN connections for uplink data it is necessary for the UE to select which connection to use for each uplink transmission. In the following disclosure a number of examples for configuring a UE to transmit data via a RAN and/or WLAN connection are provided such that the use of each connection can be optimized. The configuration of the UE is under the control of the RAN, and potentially the core network, thereby ensuring the network operators can control data transmission routes.

Figure 2:
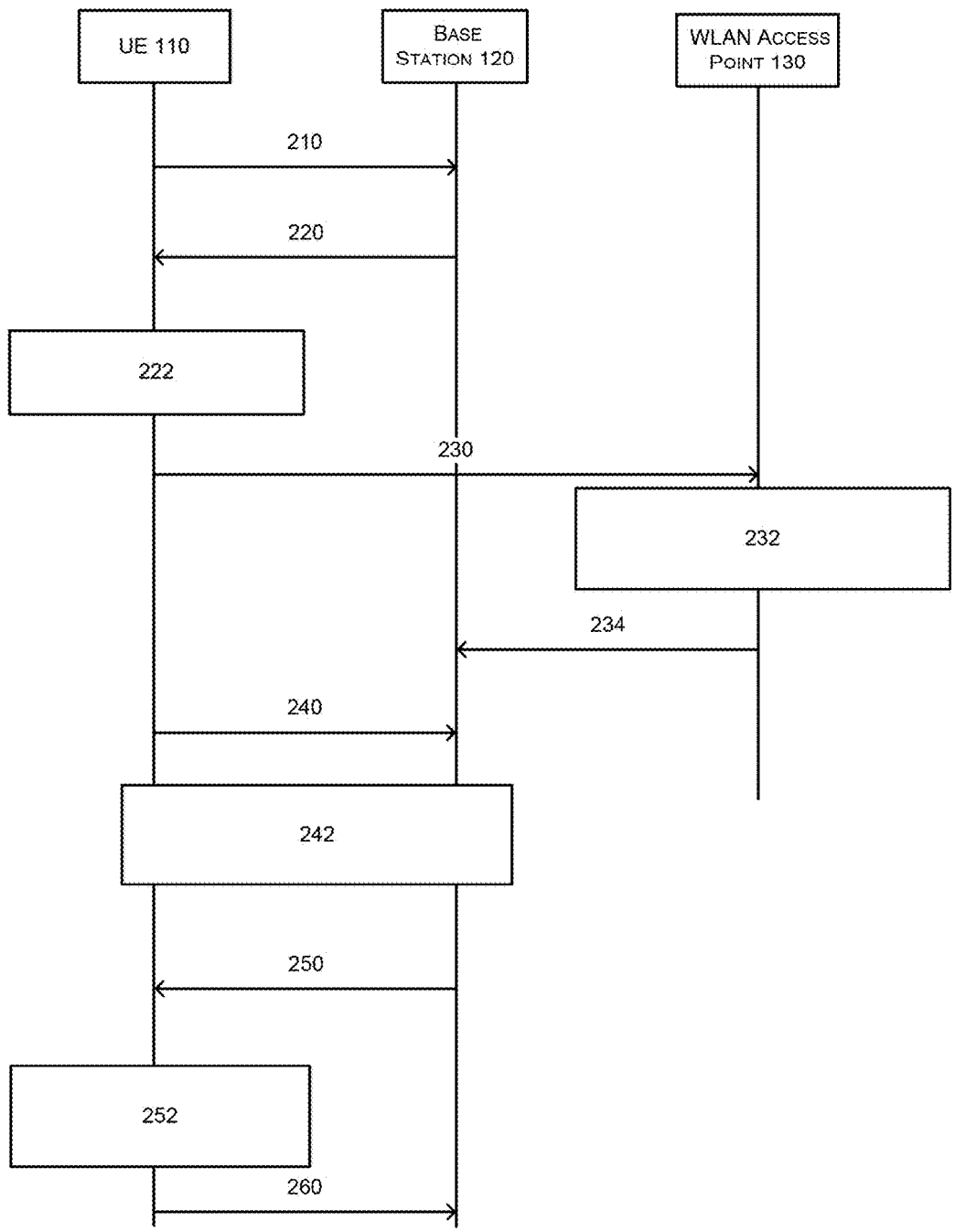
FIG. 2 is a flow chart illustrating a method of configuring a UE to transmit uplink data via WLAN.

FIG. 2 is a flow chart showing a method in which a base station requests a UE to transmit uplink data via a WLAN connection. The UE may transmit uplink data via WLAN until receiving a further request for it to switch to transmit uplink data via a RAN connection.

In step 210, the UE 110 informs the base station 120 of the UE's capability to support uplink split LWA bearers. However, this step is optional and the base station 120 may obtain the UE's capability to support uplink split LWA bearers in any other suitable way, such as receiving an indication from a third party device or maintaining a database storing the UE's capability information.

In step 220, the base station 120 requests the UE 110 to transmit uplink data via its WLAN connection. This may be performed by the base station 120 sending an LWA bearer configuration message to the UE 110 with parameters (information element(s)) that set the UE to transmit uplink data via its WLAN connection. The message may indicate that only uplink user data shall be transmitted via the WLAN connection, so that uplink control information, such as Buffer Status Reports (BSR), may still be transmitted via the RAN connection.

In response to the request, in step 222 the UE 110 may configure its LWA bearer settings so that it will transmit future uplink data via its WLAN connection. While the UE 110 configures itself to transmit uplink data via WLAN, it may maintain transmission of uplink control information via the RAN connection.

In step 230, the UE 110 transmits uplink data via its WLAN connection to the WLAN AP 130. The uplink data is transmitted in the form of LTE-WLAN Aggregation Adaptation Protocol (LWAAP) Protocol Data Units (PDUs). The UE 110 may also include a Data Radio Bearer (DRB) identity in the LWAAP PDUs to indicate which LWA bearer each PDU belongs to. The UE 110 may then embed the LWAPP PDUs in WLAN packets for transmission via the WLAN link to the WLAN AP 130. The UE 110 may use the EtherType field in an Ethernet frame of a WLAN packet to indicate that the packet relates to an LWA bearer.

In step 232, in response to receiving WLAN packets from the UE 110, the WLAN AP 130 may use the EtherType field in a received WLAN packet to ascertain that the packet relates to an LWA bearer. The WLAN AP 130 may then use the DRB identity of a PDU embedded within the WLAN packets to identify the LWA bearer to which the PDU belongs.

Once the WLAN AP 130 identifies the LWA bearer a PDU belongs to in step 232, in step 234, the WLAN AP 130 forwards the LWAAP PDU to the base station 120 via, for example, an Xw interface.

In step 240, the UE 110 may transmit uplink control information, such as Buffer Status Report (BSR) information, via the RAN connection to base station 120. The BSR indicates to the base station 120 the amount of uplink data to be transmitted by the UE 110 after transmission 230.

In step 242, the base station 120 may allocate resources in the conventional way to serve the uplink data transmission from the UE 110, depending on the amount of the uplink data to be transmitted from the UE indicated by the BSR control information in step 240.

In step 250, the base station 120 may request the UE 110 to transmit uplink data via a RAN connection. This may be performed by the base station 120 sending a message to the UE 110 requesting the UE to transmit uplink LTE data via a RAN connection.

In response to the request, in step 252, the UE 110 may configure itself to transmit future uplink data via a RAN connection.

In step 260, the UE 110 may start to transmit uplink data to the base station 120 via a RAN connection.

In the example of FIG. 2, steps 240-260 are optional steps that may or may not be performed in conjunction with steps 210-234.

Although in the example of FIG. 2 described above, the UE 110 is requested by the base station 110 in step 220 to transmit uplink LTE data via WLAN, in alternative examples, step 220 may be omitted and the UE 110 may be configured to transmit uplink LTE data via WLAN in response to any other event.

Figure 3:
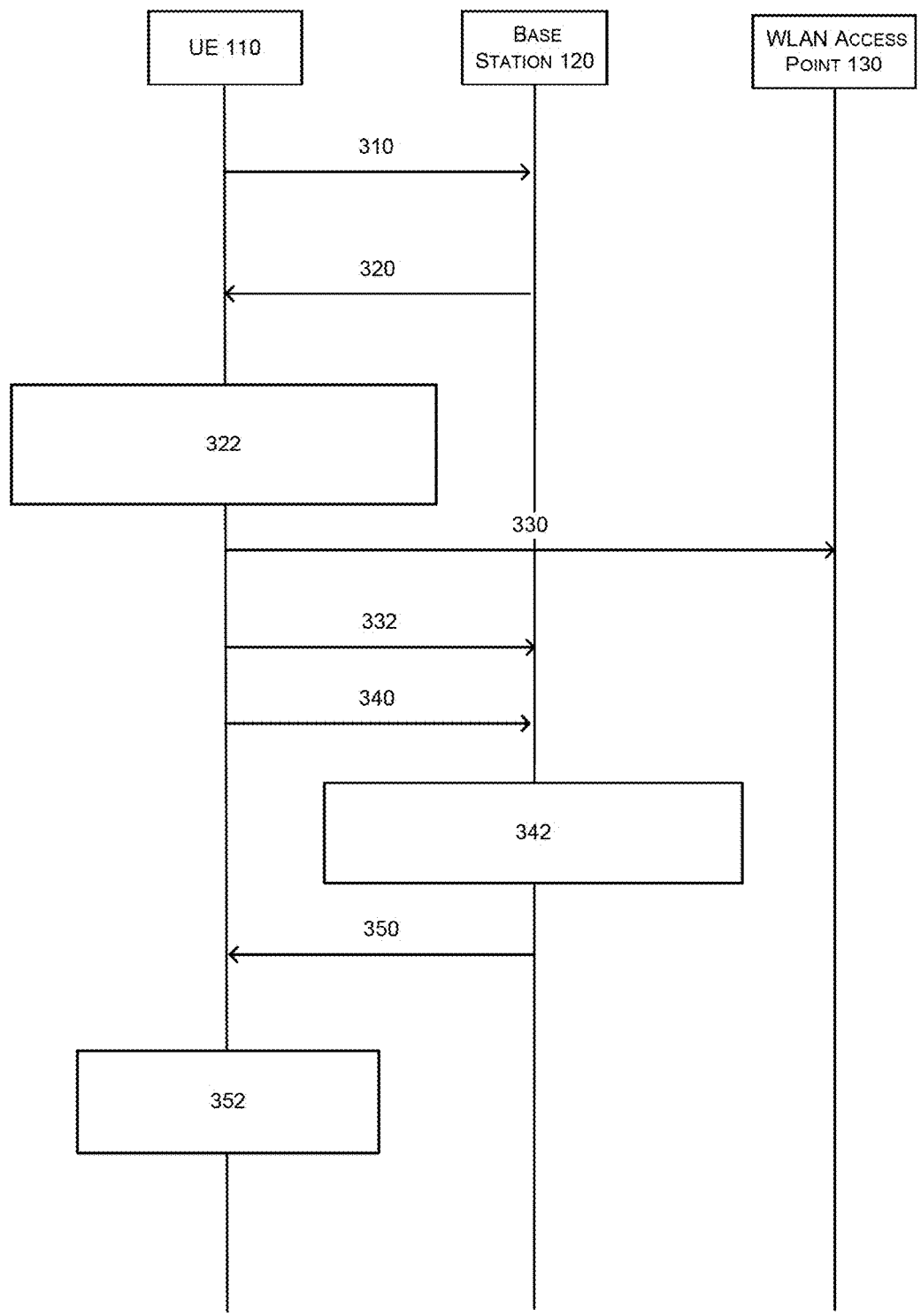
FIG. 3 is a flow chart illustrating a method of configuring a UE to retransmit uplink data via a RAN for data that failed to be transmitted over a WLAN connection.

FIG. 3 is a flow chart illustrating a method in which the base station 120 requests the UE 110 to retransmit uplink data via a RAN connection that has failed to be transmitted over WLAN.

The UE's failure to transmit data over a WLAN connection may be due to various reasons. For example, WLAN systems may use contention-based access to radio resources in which devices perform a Listen-Before-Talk (LBT) test to check resources are available. When the channel is busy, the LBT test fails and the device cannot access radio resources for a transmission.

In step 310, which is equivalent to step 210, the UE 110 may inform the base station 120 of the UE's capability to support uplink split LWA bearer.

In step 320, the base station 120 may request the UE 110 to retransmit uplink data via a RAN connection if the UE 110 has failed to transmit the data via a WLAN connection. This may be performed by the base station 120 sending an LWA bearer configuration message to the UE 110 with parameters that set the UE to retransmit uplink data via a RAN connection for uplink data that has failed to be transmitted via WLAN. The message used in step 320 may be used in conjunction with message 220 discussed in relation to FIG. 2, such that the UE is instructed to transmit data via the WLAN connection, but to re-transmit via the RAN connection in the event of a failure. Messages 220 and 320 may be the same message with one or more information elements providing the required indications.

In response to the request, in step 322 the UE 110 may configure itself to transmit uplink data via a WLAN connection, but to retransmit data that has failed to transmit via the WLAN connection, for example due to radio resources not being available during an LBT test. The UE 110 may configure itself to only transmit uplink LTE data via WLAN, and may maintain transmission of uplink control information, such as the BSR information, via the RAN connection.

In step 330, the UE 110 may attempt to transmit uplink LTE data via WLAN to WLAN AP 130.

Similar to step 230, in step 330 the UE 110 may embed the uplink data for transmission in LWAAP PDUs in WLAN packets. The UE 110 may use the EtherType field in an Ethernet frame of a packet to indicate that the packet relates to an LWA bearer. The UE 110 may also generate LWAAP PDUs with a DRB identity to indicate which LWA bearer a PDU belongs to.

In step 332, the UE 110 may detect that the uplink data transmission via WLAN in step 330 has failed and may subsequently retransmit the data via a RAN connection to base station 120. In one example, the failure to transmit the data may be due to lack of radio resources as indicated by the LBT test as explained above.

In step 340, which is similar to step 240, the UE 110 may transmit uplink control information, such as BSR information, via a RAN connection to base station 120. The BSR indicates to the base station 120 the amount of pending uplink data for transmission by the UE 110.

In step 342, which is similar to step 242, the base station 120 may allocate resources to serve the uplink data transmission from the UE 110, according to the amount of the pending uplink indicated by the BSR control information in step 340.

In step 350, the base station 120 may request the UE 110 to transmit uplink data according to a default configuration, for example via RAN or WLAN connections.

In response to the request, in step 352 the UE 110 may configure itself to transmit future uplink data via WLAN or RAN as normal.

It will be appreciated that steps 340-360 are optional steps that may or may not be performed in conjunction with steps 310-332.

Although in the example of FIG. 3 described above, the UE 110 is requested by the base station 110 in step 320 to retransmit uplink data that has failed to be transmitted over WLAN, in other examples, the retransmission may be in response to any other events.

Figure 4:
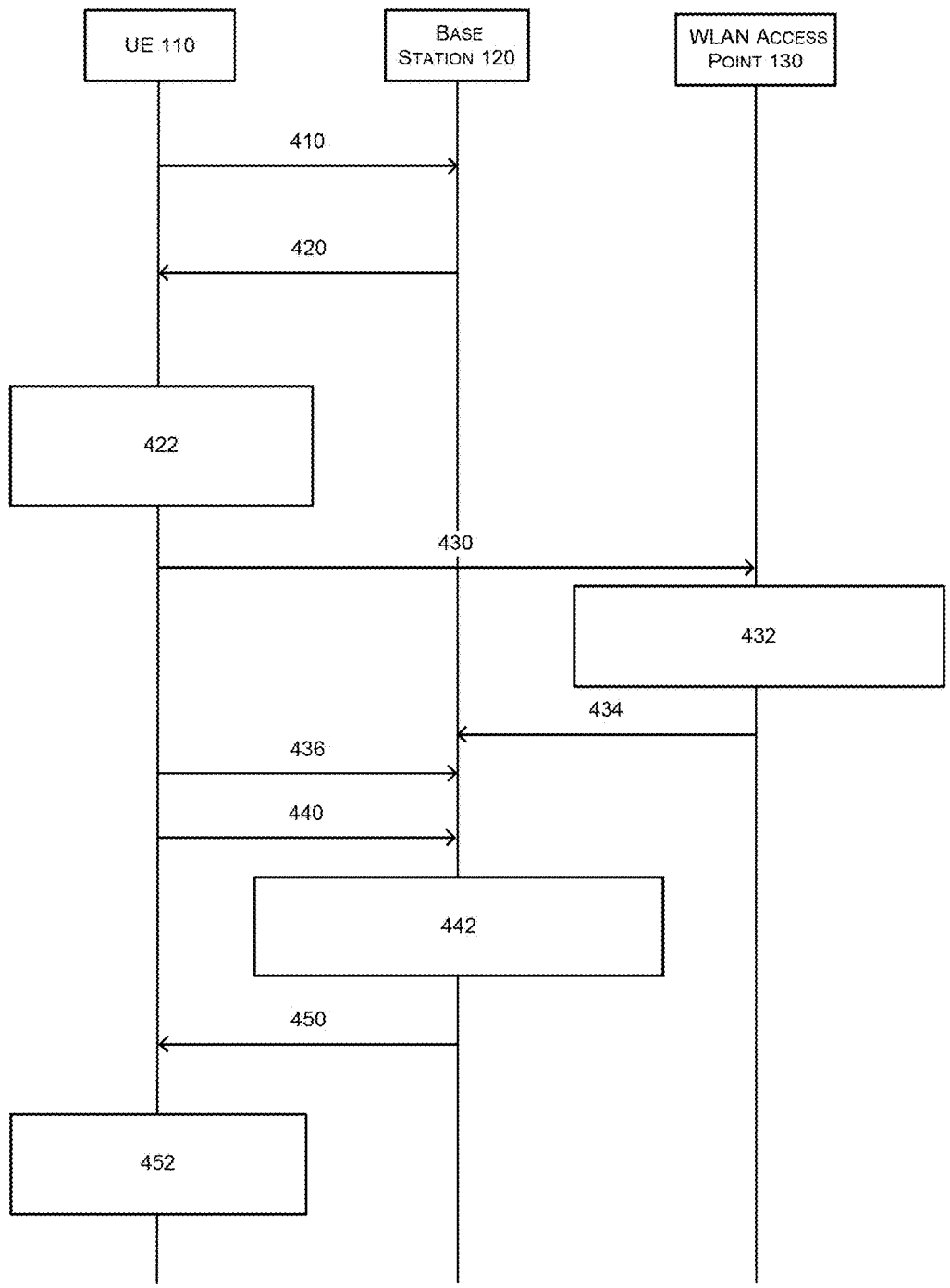
FIG. 4 is a flow chart illustrating a method of configuring a UE to transmit uplink data via both RAN and WLAN connections.

FIG. 4 is a flow chart illustrating a method of configuring a UE to transmit uplink data via both RAN and WLAN connections. The UE may be configured to transmit uplink data via both RAN and WLAN when a pre-defined condition has been met. In one example, the pre-defined condition is an amount of pending data for uplink transmission by the UE exceeds a threshold amount.

Step 410 is equivalent to steps 210 and 310, in which the UE 110 informs the base station 120 of the UE's capability to support uplink split LWA bearers.

In step 420, the base station 120 may request the UE 110 to transmit uplink data via both RAN and WLAN connections if an amount of pending data for uplink transmission exceeds a threshold amount. This may be performed by the base station 120 sending an LWA bearer configuration message to the UE 110 requesting the UE 110 to perform the required actions. The message may also indicate to the UE 110 the threshold for the amount of pending data for uplink transmission.

At step 422, after receiving the request in step 420, the UE configures itself to transmit uplink data via RAN and WLAN if the amount of pending data exceeds a threshold As shown in steps 430 and 436, if it is determined by the UE 110 that the amount of pending data for uplink transmission exceeds the threshold, the UE 110 may transmit a portion of the uplink data via a WLAN connection to the WLAN AP 130 and the other portion of the uplink data via a RAN connection to the base station 120. Steps 430 and 436 may be performed simultaneously, sequentially, repeatedly in an alternating timing pattern, or in any other suitable timing pattern.

Steps 430, 432 and 434 are equivalent to steps 230, 232 and 234, where the UE 110 may transmit uplink data to the WLAN AP 130 in the form of LWAAP PDUs, and the WLAN AP 130 may use the EtherType field and the DRB identity to determine whether a received WLAN packet relates to an LWA bearer and which LWA bearer a LWAAP PDU within the packet belongs to, and may then forward the LWAAP PDUs to base station 120.

However, in steps 422 to 436, if the UE 110 determines that the amount of pending data for uplink transmission does not exceed the predefined threshold, it may transmit uplink data according to a default configuration, which may be transmitting uplink data via either the RAN connection (step 436) or the WLAN connection (430, 432, 434).

Step 440 is equivalent to steps 240 and 340, where the UE 110 transmits uplink control information, such as the BSR information, via a RAN connection to base station 120. The BSR indicates to the base station 120 the amount of uplink data to be transmitted by the UE 110. At step 442 the base station may allocate RAN radio resources for the indicated data.

In step 450, the base station 120 may alter the threshold for the amount of pending data for uplink transmission by the UE 110 and informs the UE 110 of this altered threshold. This step may be performed at any time after the initial instruction to begin applying a threshold and does not need to be in the same message exchange, but is shown in FIG. 4 for convenience. For example the threshold may be raised based on the amount of pending uplink data to be transmitted from the UE 110 as indicated by the BSR control information. In other examples the threshold may be reduced, and the reasons for increasing or decreasing the threshold may be different, or there may be no change in which case message 450 is not required.

In response to receiving the altered threshold, in step 452 the UE 110 may configure itself to transmit uplink data according to whether the amount of pending data exceeds this altered threshold. If this threshold is raised and the amount of pending uplink data is below the raised threshold, the UE 110 may transmit uplink data according to a default configuration, which may be transmission via either LTE or WLAN as explained above.

In the example of FIG. 4 described above, the threshold is set as a threshold for pending uplink data above which the UE 110 will transmit uplink data via both LTE and WLAN. However, it will be appreciated that in an alternative example the threshold may be a threshold for pending uplink data below which the UE 110 would transmit uplink data via both LTE and WLAN. For example, the WLAN AP may be congested making it attractive to distribute even small amounts of data between the WLAN and RAN connections.

Figure 5:
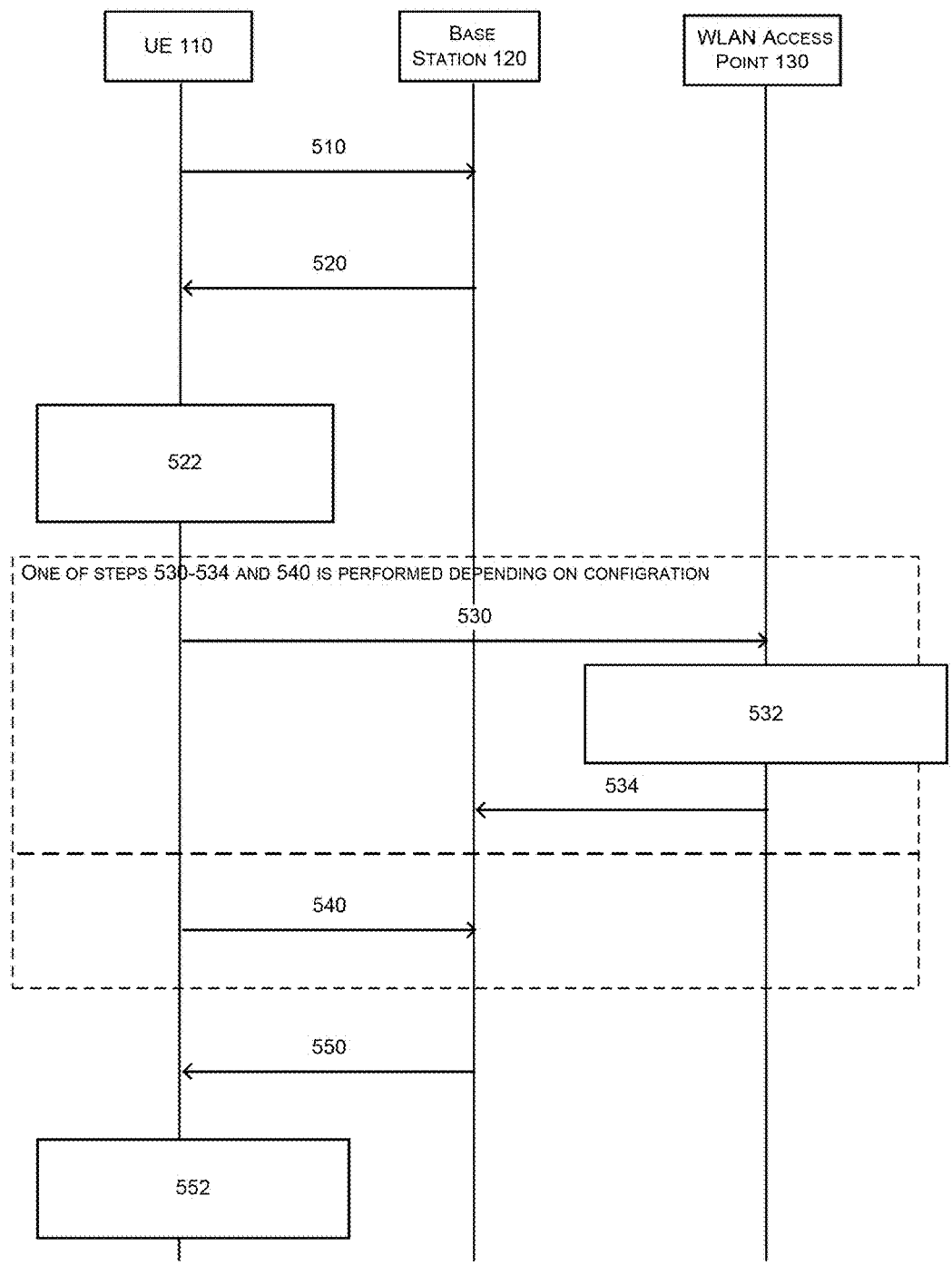
FIG. 5 is a flow chart illustrating a method of configuring a UE to transmit uplink data via LTE or RAN connections.

FIG. 5 is a flow chart illustrating a method of configuring a UE to transmit uplink data via RAN or WLAN connections. The UE may be configured to transmit uplink data via RAN or WLAN connections only when a pre-defined condition has been met. In one example, the pre-defined condition is an amount of pending data for uplink transmission by the UE exceeds a threshold amount. For example it may be beneficial to use the higher data transfer rate often associated with WLAN connections when there is a large amount of data.

Step 510 is equivalent to steps 210, 310 and 410, in which the UE 110 informs the base station 120 of the UE's capability to support uplink split LWA bearers.

In step 520, the base station 120 may request the UE 110 to transmit uplink data via LTE or WLAN only if an amount of pending data for uplink transmission by the UE 110 exceeds a threshold. This may be performed by the base station 120 sending an LWA bearer configuration message to the UE 110 requesting the UE 110 to perform the required actions. The message may also indicate to the UE 110 the threshold for the amount of pending data for uplink transmission.

In response to the request, in step 522 the UE 110 configures itself as requested. The UE 110 may maintain transmission of uplink control information, such as the BSR information, via the RAN connection, regardless of the connection used for data.

If an amount of data for transmission is above the threshold, then one of steps 530-534, or 540 is performed depending on the requested configuration. That is, if the configuration requests that the WLAN connection is used above a threshold steps 530-534 are performed, and if the configuration requests the RAN connection is used step 540 is performed. These options are alternatives to one another.

Steps 530-534 are equivalent to steps 230-234 and 430-434, where the UE 110 may transmit uplink data to the WLAN AP 130 in the form of LWAAP PDUs embedded in WLAN packets, and the WLAN AP 130 may use the EtherType field and the DRB identity to determine whether a received data packet relates to an LWA bearer and which LWA bearer it relates, and may then forward the LWAAP PDU to base station 120.

If the UE 110 determines that the amount of pending data for uplink transmission does not exceed the threshold, it may transmit uplink data according to a default configuration, which may be transmitting uplink data via either the RAN or WLAN connections.

In step 550, the base station 120 may alter the threshold for the amount of pending data for uplink transmission by the UE 110 and informs the UE 110 of the altered threshold. In one example, the alteration includes raising the threshold.

In response to receiving the altered threshold, in step 552 the UE 110 may configure itself to transmit uplink data according to whether the amount of pending data exceeds this altered threshold. If this threshold is raised and the amount of pending uplink data is below the raised threshold, the UE 110 may transmit uplink data according to a default configuration, which may be transmitting uplink data via either the RAN or WLAN connections. As above, steps 550 and 552 need not be performed.

In the example of FIG. 5, the threshold is set to be the threshold for pending uplink data above which the UE 110 would transmit uplink data via RAN or WLAN connections. However, it will also be appreciated that, in alternative examples, the threshold may be a threshold for pending uplink data below which the UE 110 will transmit uplink data via LTE or WLAN.

In other examples, the threshold may be replaced by a range of pending uplink data amounts, within which the UE 110 is configured to transmit the pending uplink data via the RAN or WLAN connections. In one example, the UE 110 may be configured to transmit uplink data via the RAN connection if the amount of pending uplink data is within a first range, and to transmit the pending uplink data via WLAN if the amount of pending uplink data is within a second range, or outside of the first range.

Figure 6:
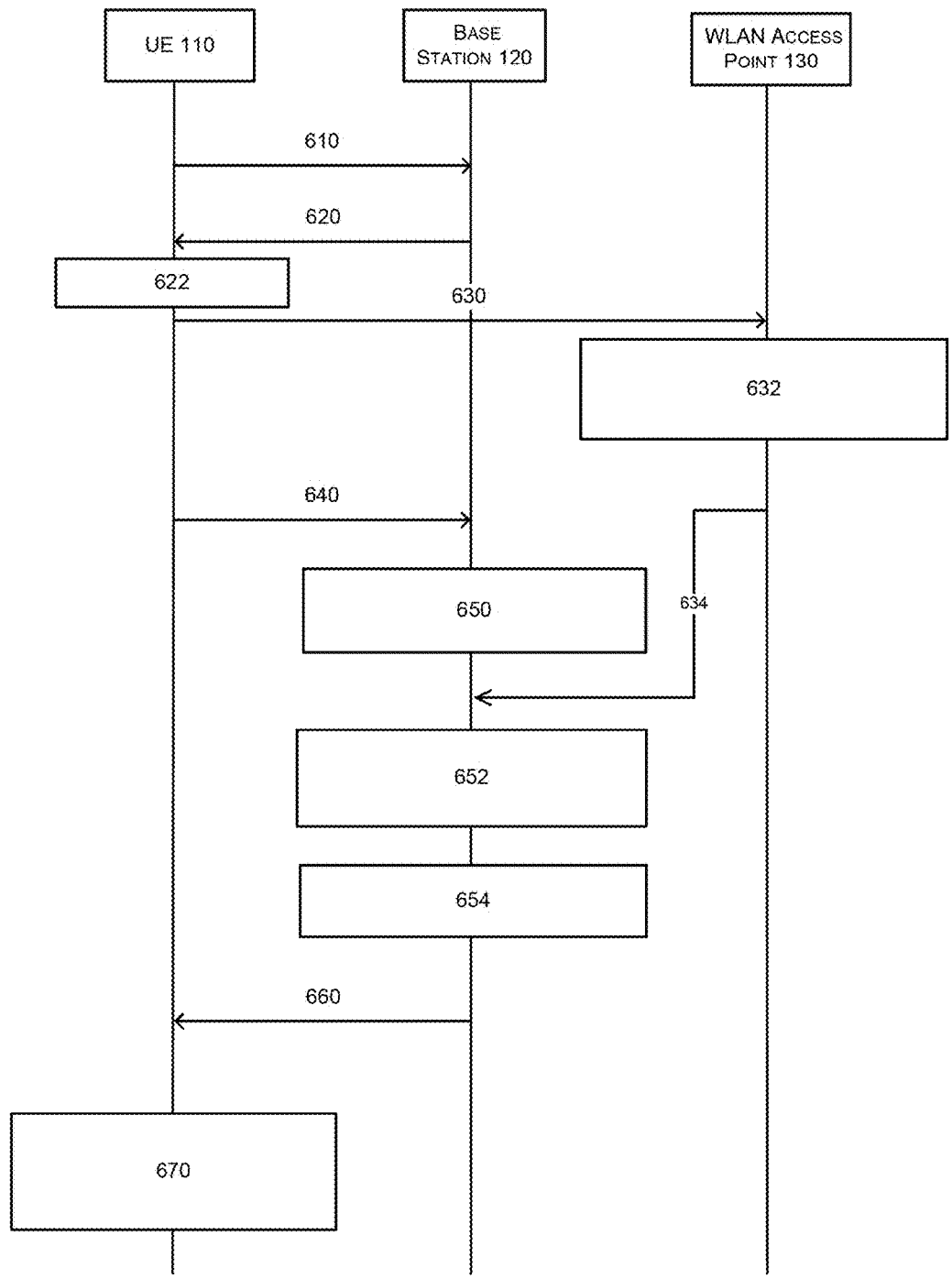
FIG. 6 is a flow chart illustrating a method in which a base station configures a UE to apply a delay offset to transmission of uplink data via RAN connections.

FIG. 6 is a flow chart illustrating a method in which a base station configures a UE to apply a delay offset to transmission of uplink data via RAN after previously transmitting uplink data via WLAN to account for differing propagation delays between transmission via RAN and WLAN.

Step 610 is equivalent to steps 210, 310, 410 and 510, in which the UE 110 informs the base station 120 of the UE's capability to support uplink split LWA bearers.

In step 620, the base station 120 may send an LWA bearer configuration message to the UE 110 with parameters that configure the UE to transmit uplink data via both LTE and WLAN, for example as described in relation to FIG. 4.

In step 630, the UE 110 transmits a first uplink data PDU, which is an LWAAP PDU embedded in a WLAN packet, to the WLAN AP 130. For explanation purposes the first uplink data PDU has a PDCP sequence number of SN.

In step 632, the WLAN AP 130 may use the EtherType field of the WLAN packet to determine whether a received data packet relates to an LWA bearer and use the DRB identity in the LWAAP PDU to determine which LWA bearer it relates. In step 634, the WLAN AP 130 may forward the LWAAP PDU to base station 120.

After performing step 630, in step 640, the UE 110 transmits a second uplink data PDU in the form of PDCP PDU to the base station 130 via a RAN connection. For this explanation the second uplink data PDU has a PDCP sequence number of SN+1. This means that the second uplink data PDU is the same sequence with and immediately follows the first uplink data PDU. However, batches of PDUs may be transmitted via each route.

However, due to delays, such as listen-before-talk and backhaul delay, the base station 120 may receive the first PDU from WLAN AP 130 at time $T_{SN}$ (step 652) after receiving the second PDU from base station 120 at time $T_{SN+1}$ (step 650). In step 650, the base station 120 notes the time $T_{SN+1}$ for reception of the second PDU. In step 652, the base station 120 notes the time $T_{SN}$ for reception of the first PDU.

In step 654, the base station 120 determines the delay between transmission via WLAN and RAN by calculating the difference between $T_{SN}$ and $T_{SN+1}$.

In step 660, the base station 120 may inform the UE 110 of the time difference between transmission via WLAN and RAN connections. This may be achieved by the base station 120 sending an LWA bearer configuration message indicating a timing offset representing the difference to the UE 110.

In step 670, the UE 110 applies the timing difference to further uplink transmissions such that data sent via the RAN connection is delayed compared to data sent via the WLAN. This means that for subsequent uplink transmissions, the UE 110 will send a first PDU with sequence number SN via WLAN to AP 130, and the UE 110 would wait for a time period no shorter than the timing difference before sending a second PDU with sequence number SN+1 via the RAN connection to base station 120. In this way, the second PDU has better chances of arriving at the base station 120 after the first PDU. Then, as far as the base station 120 is concerned, the PDUs received will be in the correct order, even if they were sent via different routes (WLAN or RAN). This reduces the need for the base station 120 to reorder received PDUs due to reception in an incorrect order. Transmission times may vary and thus some packets may still arrive out of sequence, but this process improves the probability of correct ordering at the base station.

In the example of FIG. 6 described above, the base station 120 performs the calculation of the time difference between WLAN transmission and RAN transmission. However, in an alternative example, the base station 120 may obtain the time difference from any other suitable source and steps 630-652 may be omitted.

In the examples of FIGS. 2-6 described above, the configuration of UE 110 in steps 222, 322, 422, 522 and 622 is performed in response to a request from the base station 120 in steps 220, 320, 420, 520 and 620 respectively. This allows the base station 120 and the radio access network to have more control over uplink data transmission.

In alternative examples, the UE 110 may be configured in steps 222, 322, 422, 522 and 622 in response to an event other than a request from the base station 120. For example, the UE 110 may be configured in any of these steps in response to a signal quality of the WLAN or RAN connection falling below a pre-determined standard, or any other parameter exceeding a predefined threshold. This allows finer tuning according to information available for example the observed uplink WLAN throughput in the UE.

The above examples are provided by way of example only. The disclosure of this application is not restricted by the specific combination of steps shown in the figures, and described herein, but includes any appropriate subsets or combinations of steps performed in any appropriate order. Sections of the method may be performed in parallel.

The term 'user equipment' (UE) is used herein to refer to any device with processing and telecommunication capability such that it can perform the methods and functions according to the examples of the present invention. Those skilled in the art will realize that such processing and telecommunication capabilities can be incorporated into many different devices and therefore the term 'user equipment' includes mobile telephones, personal digital assistants, PCs and many other devices.

Any range or device value given herein may be extended or altered without losing the effect sought, as will be apparent to the skilled person.

The skilled person may adapt the examples for use in any telecommunication network, such as 4G, 3G and 2G or with any other telecommunication standard without losing the effect sought.

It will be understood that the benefits and advantages described above may relate to one example or may relate to several examples. The examples are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred examples is given by way of example only and that various modifications may be made by those skilled in the art. Although various examples have been described above with a certain degree of particularity, or with reference to one or more individual examples, those skilled in the art could make numerous alterations to the disclosed examples without departing from the scope of this invention.

The invention claimed is:

1. A method for communication between a mobile device and a base station, wherein the mobile device is in wireless communication directly with the base station and in wireless communication with a WLAN access point, which WLAN access point is in communication with the base station, the method performed at the mobile device and comprising the steps of:
  configuring the mobile device according to pre-defined rules to transmit data from the mobile device to the base station directly to the base station and/or via the WLAN access point; and
  transmitting data from the mobile device to the base station according to the received rules, wherein the pre-defined rules are received by the mobile device from the base station,
  wherein the pre-defined rules indicate a threshold amount of data for transmission from the mobile device used to determine whether the data is transmitted directly to the base station and/or via the WLAN access point,
  wherein the pre-defined rules indicate that if the mobile device has greater than the threshold amount of data for transmission to the base station, that data should be transmitted to the base station via the WLAN access point or that data should be transmitted directly to the base station; and
  wherein the pre-defined rules indicate that if the mobile device determines that the amount of pending data for uplink transmission does not exceed the threshold, the data should be transmitted either to the base station or the WLAN access point.

2. The method according to claim 1, wherein the pre-defined rules indicate that all data should be transmitted via the WLAN access point.

3. The method according to claim 1, wherein the pre-defined rules indicate that if data fails to be transmitted via the WLAN access point, the mobile device should retransmit that data directly to the base station.

4. The method according to claim 3, further comprising the step of transmitting data directly to the base station that has previously failed to be transmitted to the base station via the WLAN access point.

5. The method according to claim 1, wherein the pre-defined rules indicate that if the mobile device has greater than the threshold amount of data for transmission to the base station, part of the data should be transmitted directly to the base station and the other part of the data should be transmitted via the WLAN access point.

6. The method according to claim 1, wherein control information is transmitted directly from the mobile device to the base station regardless of the pre-defined rules.

7. A method for communication between a mobile device and a base station, wherein the mobile device is in wireless communication directly with the base station and in wireless communication with a WLAN access point, which WLAN access point is in communication with the base station, the method performed at the mobile device and comprising the steps of:
  configuring the mobile device according to pre-defined rules to transmit data from the mobile device to the base station directly to the base station and/or via the WLAN access point; and
  transmitting data from the mobile device to the base station according to the received rules, wherein the pre-defined rules are received by the mobile device from the base station,
  wherein the pre-defined rules indicate a threshold amount of data for transmission from the mobile device used to determine whether the data is transmitted directly to the base station and/or via the WLAN access point;
  wherein data transmitted via the WLAN access point is transmitted in the form of LTE-WLAN Aggregation Adaptation Protocol PDUs; and
  wherein the PDUs comprise a Data Radio Bearer identity.

8. The method according to claim 7, wherein the PDUs are embedded in WLAN packets for transmission via the wireless connection to the WLAN access point, and the EtherType field indicates the packets relate to an LWA bearer.

9. The method according to claim 7, wherein the PDUs are embedded in WLAN packets for transmission via the wireless connection to the WLAN access point, and the EtherType field indicates the packets relate to an LWA bearer.

10. The method according to claim 1, and further comprising the step of the WLAN access point forwarding received data to the base station.

* * * * *